United States Patent [19]

Russo

[11] Patent Number: 4,601,140
[45] Date of Patent: Jul. 22, 1986

[54] LAWN EDGING SYSTEM

[76] Inventor: Robert W. Russo, 19006 E. Heber St., Glendora, Calif. 91740

[21] Appl. No.: 722,139

[22] Filed: Apr. 11, 1985

[51] Int. Cl.⁴ ............................................. E02D 27/00
[52] U.S. Cl. ........................................... 52/102; 404/7
[58] Field of Search ...................... 52/102, 726; 404/7; 403/312, 402, 403

[56] References Cited

U.S. PATENT DOCUMENTS

| | | | |
|---|---|---|---|
| 348,598 | 9/1889 | Strickland | 52/102 |
| 433,219 | 7/1980 | Schwartz | |
| 771,432 | 10/1904 | Martin | |
| 818,884 | 4/1906 | Grimm | |
| 1,166,664 | 1/1916 | Dargento | 404/7 |
| 1,789,265 | 3/1931 | McGibbon | |
| 2,177,932 | 10/1939 | Battey et al. | |
| 2,794,375 | 6/1957 | Di Falco et al. | 404/7 |
| 3,201,834 | 8/1965 | Baittinger | 403/312 |
| 3,258,282 | 6/1966 | Koenigshof | |
| 3,261,135 | 7/1966 | Knabe | |
| 3,590,546 | 7/1971 | Lambert | 403/403 X |
| 4,074,479 | 2/1978 | Krupka | |

Primary Examiner—Carl D. Friedman
Attorney, Agent, or Firm—William W. Haefliger

[57] ABSTRACT

For landscape edging, these are provided:
(a) multiple, elongated, concrete strips extending end-to-end to form joints therebetween, each strip having a top, bottom, opposite sides and opposite ends,
(b) multiple fasteners carried by said strips, each strip having opposite end portions from each of which two fasteners project sidewardly from the side of the strips,
(c) elongated ties to which the fasteners are connected, each tie extending at the sides of two successive strips and bridging the joint therebetween, to hold the strips in endwise assembled relation and to prevent misalignment between the strips.

7 Claims, 12 Drawing Figures

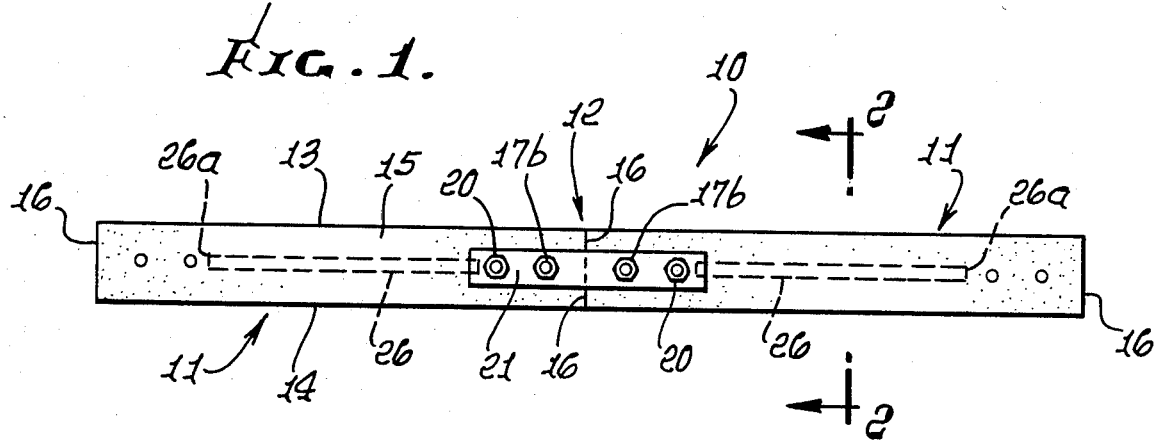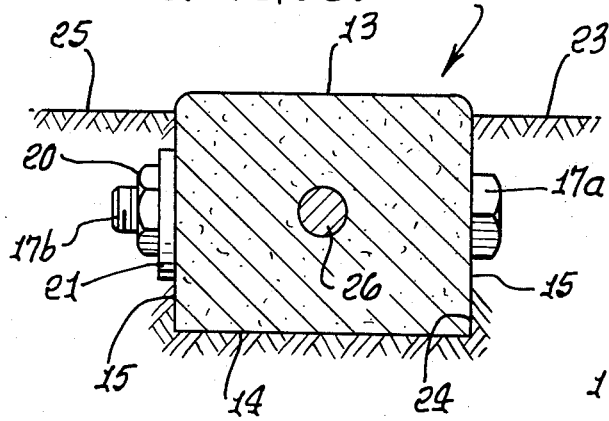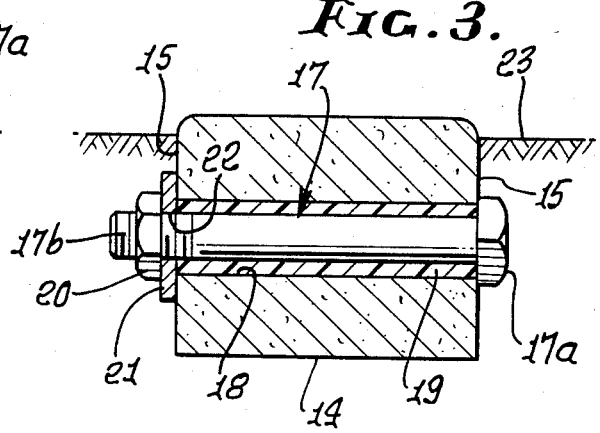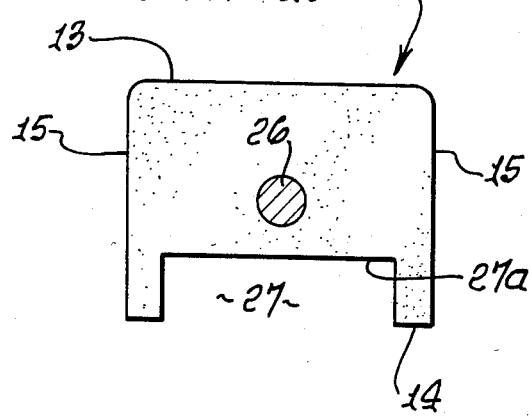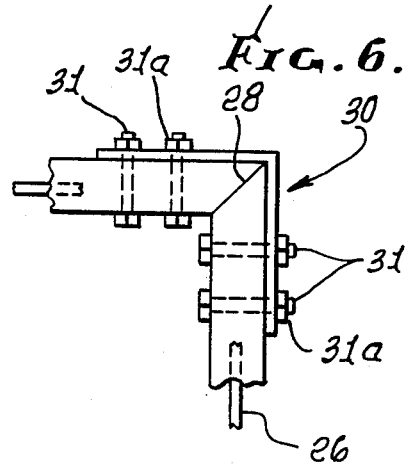

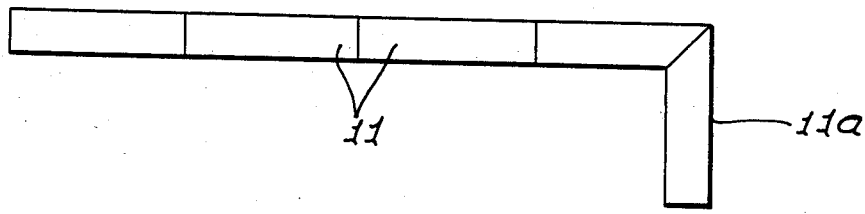
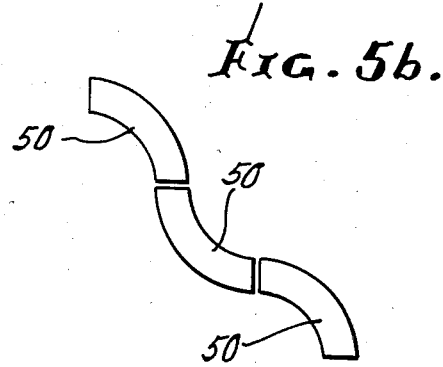
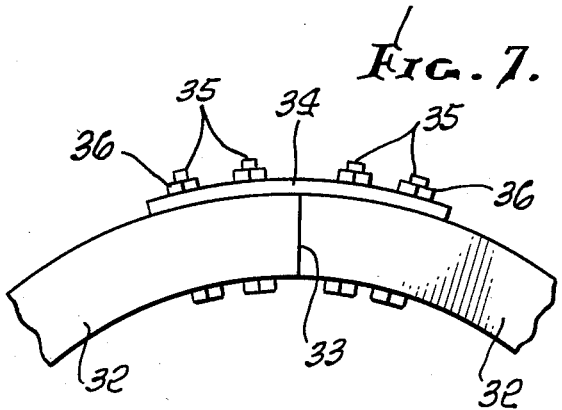
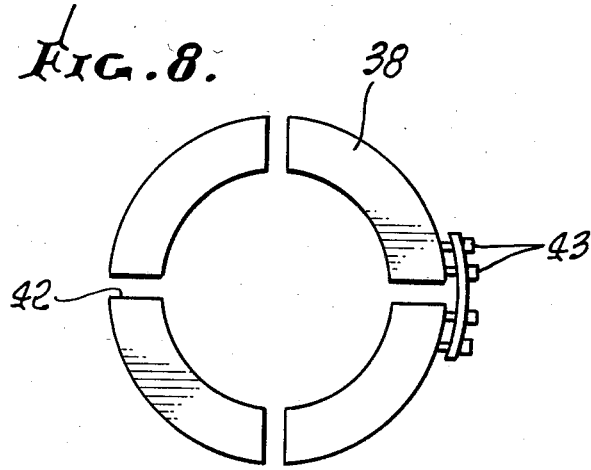
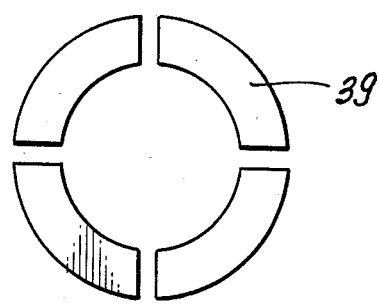
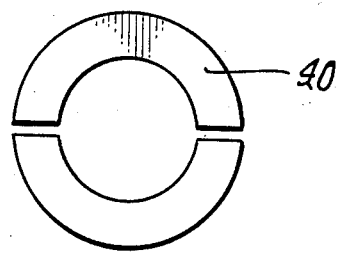
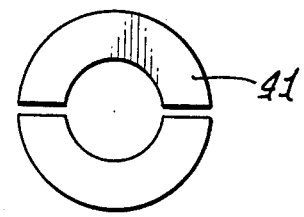

LAWN EDGING SYSTEM

BACKGROUND OF THE INVENTION

This invention relates generally to lawn or landscape edging, and more particularly to permanent edge strips that are easily formed and installed, for various configuration edges.

In the past, wooden strips were installed along the edges of lawns or at landscape edges. Such strips tend to break, splinter and rot, necessitating their replacement from time to time, this being inconvenient, expensive, and time consuming. Attempts have been made to provide more permanent strips, but they tend to buckle at joints, over longer periods of time, producing an unsightly border. There is need for border stripping that is not subject to such disadvantages.

SUMMARY OF THE INVENTION

It is a major object of the invention to provide a solution to the above problems and disadvantages, by means of a border edging or stripping of superior construction. Basically, the invention is exemplified by (a) multiple, elongated, concrete strips extending end-to-end, to form joints therebetween, each strip having a top, bottom, opposite sides and opposite ends, (b) multiple fasteners carried by said strips, each strip having opposite end portions from each of which two fasteners project sidewardly from the side of the strip, (c) elongated ties to which the fasteners are connected, each tie extending at the sides of two successive strips and bridging the joint therebetween, to hold the strips in endwise assembled relation and to prevent misalignment between the strips.

Such an edging cannot buckle at joints, is free from rot, splintering and breakage, and is easily fabricated and installed.

Additional objects include the provision of lightweight strips of this instruction, having recesses sunk upwardly therein along their length; reinforced strips having elongated reinforcing rods therein that are spaced from the fasteners that extend laterally through the strips, as will be seen, and strips having curvature along their lengths to conform to landscape edges, or having mitred ends to form angles, the ties also having such curvature or angularity. Such strips, consisting of concrete, can have selected coloring to match that of adjacent landscaping, if desired.

These and other objects and advantages of the invention, as well as the details of an illustrative embodiment, will be more fully understood from the following specification and drawings, in which:

DRAWING DESCRIPTION

FIG. 1 is a side elevation showing interconnection of successive strips;

FIG. 2 is an enlarged section on lines 2—2 of FIG. 1;

FIG. 3 is a section taken through a strip at the location of a fastener;

FIG. 4 is a cross-section showing a modified, i.e. recessed strip;

FIGS. 5a and 5b are views of modified strips having mitred ends;

FIG. 6 is a fragmentary plan view showing interconnection of strips at a mitred end joint;

FIG. 7 is a fragmentary plan view showing interconnection of curved strips; and

FIGS. 8-11 are views showing different radius size strips.

DETAILED DESCRIPTION

In FIGS. 1-3, the edging 10 includes multiple, elongated concrete strips 11 extending end-to-end to form joints 12 therebetween. Each concrete strip is generally rectangular in cross-section, and has a top 13, bottom 14, opposite sides 15 and opposite ends 16.

Multiple fasteners, such as bolts, are carried by the strips, each strip having opposite end portions from which two fasteners 17 project sidewardly from the sides of the strips. The fasteners, 17 are shown as extending through openings 18 in the strips, and as having heads 17a at one side 15 and threaded ends 17b projecting at the opposite side, of the strips. Protective sleeves 19 may extend in the openings 18 and the fasteners then project through the sleeves. The latter may consist of synthetic resin. Nuts 20 are threaded onto the bolts and tightened to hold ties in the form of bars 21 clamped in place against the sides of the concrete strips.

Each bar 21 has four holes 22 through it, at endwise spaced locations, to closely fit over the ends of the four projecting fasteners. Thus, each tie bridges a joint 12 to hold successive strips in endwise assembled relation, preventing buckling of the joint, and holding the strips aligned in selected relation. This is important, since movement of the ground 23 in which the strips are set may otherwise tend to misalign them. Note in FIG. 2 that the strips are received in a trough 24 formed in the ground, below ground surface level 25.

Each strip may contain a reinforcement bar or end, as of steel, and indicated at 16. The bar extends endwise in the strip, but does not contact the fasteners; thus, it may terminate, as shown, at ends 26a in spaced relation to the fasteners. Further, to lighten the strips, they may have elongated recesses 27 sunk upwardly from their undersides 14, as indicated in FIG. 4, the uppermost surfaces 27a of the recesses being below the level of the fasteners. Such recesses may extend lengthwise throughout the strip lengths.

FIG. 5a shows a sequence of strips 11 connected end-to-end as in FIG. 1, one at 11a being L-shaped to turn the border direction 90°, as in FIG. 6. FIG. 6 shows two mitred ends held in face-to-face engagement, forming a 90° turn, as by an L-shaped tie 30 which fits over the ends of two bolts 31 projecting from each strip, as shown. Nuts 31a tightened on the bolts hold the assembly in clamped relation.

FIG. 7 shows a similar assembly, except that the two modified concrete strips 32 are curved and have abutting ends at joint 33. A correspondingly curved tie plate or bracket 34 has holes fitting over the projecting ends of the four bolts 35, and nuts 36 clamp to tie to the strips 32, as shown.

FIGS. 8-11 show groups of concrete strips having circular segment configuration, the strips 38 and 39 in FIGS. 8 and 9 being quadrant segments, and the strips 40 and 41 in FIGS. 10 and 11 being semicircular segments. Their flat ends, as at 42, may be attached as by the bolt pairs 43 and ties, to the flat ends of other curved or straight strips, to form various configurations of edging matching the curvature of the lower edge, for example.

FIG. 5 shows an interconnected succession of strips as at 50, certain strips inverted to give an S-shaped border.

I claim:

1. In a landscape edging, the combination comprising
   (a) multiple, elongated, concrete strips extending end-to-end, to form joints therebetween, each strip having a top, bottom, opposite sides and opposite ends,
   (b) multiple fasteners carried by said strips, each strip having opposite end portions from each of which two fasteners project sidewardly from the side of the strips,
   (c) elongated ties to which the fasteners are connected, each tie extending at the sides of two successive strips and bridging the joint therebetween, to hold the strips in endwise assembled relation and to prevent misalignment between the strips, successive strips interconnected by one tie,
   (d) each tie being connected to four fasteners, two of which project from one strip and two of which project from the next successive strip,
   (e) and including sleeves extending protectively about the fasteners within each strip, the sleeves extending to opposite side faces of the strips, and
   (f) each strip containing a reinforcing bar that extends endwise therein and is everywhere spaced from said fasteners, but is located generally in alignment with the fasteners.

2. The combination of claim 1 wherein said strips have elongated recesses sunk upwardly therein from the bottom of the strip and located between said opposite sides of the strip, the bar everywhere spaced from said recess.

3. The combination of claim 1 wherein the strips, ties and bars are lengthwise curved to accomodate to a curved landscape edge.

4. The combination of claim 1 wherein the ends of certain of the strips are mitred, whereby successive strips define an angle.

5. The combination of claim 4 wherein certain of the ties are bent to define a corresponding angle.

6. The combination of claim 5 wherein the fasteners extend laterally through the strips, the strips sunk below lawn surface level to conceal the fasteners and ties.

7. The combination of claim 1 wherein said one tie is the only tie interconnecting each pair of strips, at one side only thereof.

* * * * *